(12) United States Patent
Ravikumar et al.

(10) Patent No.: US 7,879,135 B2
(45) Date of Patent: Feb. 1, 2011

(54) CONFIGURATIONS AND METHODS FOR CLAUS PLANT OPERATION WITH VARIABLE SULFUR CONTENT

(75) Inventors: Ravi Ravikumar, Lancaster, CA (US); Gordon Sims, Mission Viejo, CA (US); Harold Sandler, Costa Mesa, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 378 days.

(21) Appl. No.: 11/911,707

(22) PCT Filed: Apr. 20, 2006

(86) PCT No.: PCT/US2006/015497
§ 371 (c)(1),
(2), (4) Date: Nov. 19, 2008

(87) PCT Pub. No.: WO2006/113935
PCT Pub. Date: Oct. 26, 2006

(65) Prior Publication Data
US 2009/0092524 A1   Apr. 9, 2009

Related U.S. Application Data

(60) Provisional application No. 60/673,495, filed on Apr. 20, 2005.

(51) Int. Cl.
*B01D 53/14* (2006.01)
*C01B 17/04* (2006.01)

(52) U.S. Cl. ............... 95/11; 95/235; 96/244; 423/228

(58) Field of Classification Search ........... 96/243, 96/244, 397, 399; 95/8, 11, 235; 423/220, 423/228, 229, 242.1; 585/822, 833, 860, 585/864
See application file for complete search history.

(56) References Cited

U.S. PATENT DOCUMENTS

| | | | |
|---|---|---|---|
| 3,864,460 A * | 2/1975 | Connell | 423/574.1 |
| 4,210,627 A | 7/1980 | Verloop et al. | |
| 4,242,108 A * | 12/1980 | Nicholas et al. | 95/166 |
| 4,430,316 A | 2/1984 | Ranke et al. | |
| 4,519,991 A | 5/1985 | Oliveau et al. | |
| 4,741,884 A * | 5/1988 | Carter et al. | 422/171 |
| 5,718,872 A | 2/1998 | Khanmamedov | |
| 6,090,356 A * | 7/2000 | Jahnke et al. | 423/210 |
| 6,616,908 B2 * | 9/2003 | Watson et al. | 423/573.1 |
| 2005/0103194 A1 | 5/2005 | Huder et al. | |

* cited by examiner

*Primary Examiner*—Frank M Lawrence
(74) *Attorney, Agent, or Firm*—Fish & Associates, PC

(57) ABSTRACT

Contemplated plants include an acid gas enrichment unit in which acid gas unsuitable for feeding into a Claus plant from an upstream acid gas removal unit is separated into a concentrated hydrogen sulfide stream that is fed to the Claus plant and a carbon dioxide stream that is compressed in a compressor before sequestration, further purification, and/or recycling to a gasification unit.

20 Claims, 1 Drawing Sheet

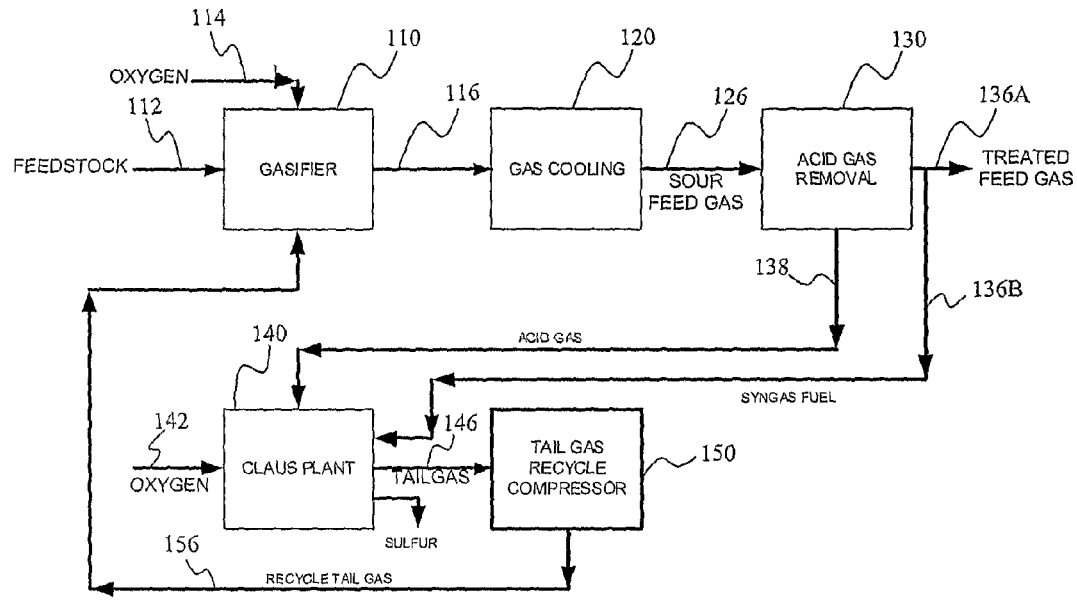
Prior Art Figure 1
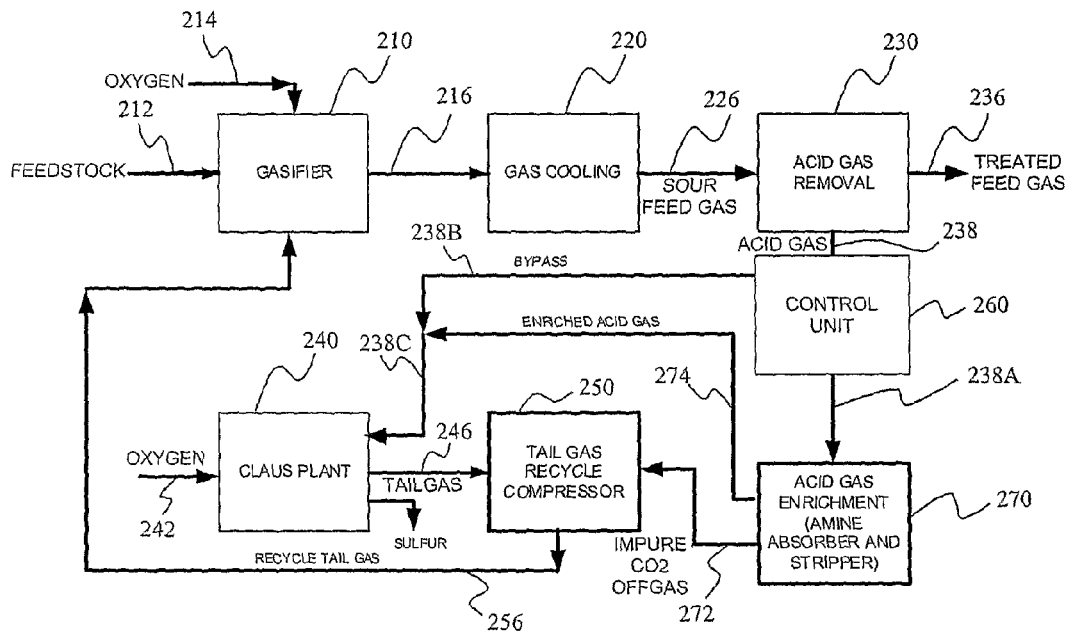
Figure 2

CONFIGURATIONS AND METHODS FOR CLAUS PLANT OPERATION WITH VARIABLE SULFUR CONTENT

This application claims priority to our copending U.S. provisional patent application with the Ser. No. 60/673,495, which was filed Apr. 20, 2005, and which is incorporated by reference herein.

FIELD OF THE INVENTION

The field of the invention is sulfur recovery from acid gases, and especially acid gases with variable and/or low sulfur content.

BACKGROUND OF THE INVENTION

Among other significant operational parameters, flexibility to use diverse feed stocks is often critical to economic operation of coal and coke gasification plants. For example, depending on the specific market conditions, desirable feed stocks can range from low sulfur sub-bituminous coal to high sulfur bituminous coal or petroleum coke. As a consequence, the hydrogen sulfide concentration in the acid gas that is separated from the sour syngas in the acid gas removal unit often varies due to the varying sulfur content in different gasifier feedstocks. This acid gas is often directed to a Claus sulfur recovery unit, where hydrogen sulfide and other sulfur compounds in the gas are converted to saleable elemental sulfur. However, and especially when hydrogen sulfide concentration in the acid gas is below a critical level, Claus unit efficiency may drop to a critical level.

To improve Claus process efficiency for feed gases with relatively low sulfur content, Claus plants may be run with oxygen as the oxidant (instead of air). Most typically, feed gas to an oxygen-blown Claus plant should comprise at least 20-25 mol % of sulfur compounds to maintain economic operation. Where the feed gas to the Claus plant is even leaner, treated syngas (exiting the acid gas removal unit) or other support fuel must often be combusted in the acid gas burner/reactor to maintain proper temperature. Such an oxygen-blown Claus plant with support fuel can process feed gases with hydrogen sulfide concentrations as low as 10 mol %.

Where the sulfur concentration in the Claus feed gas drops below these critical levels (e.g., below 10-25 mol %), addition of oxygen and/or supplementation with support fuel often fails to remedy the above problems in a practical or economic manner. In such cases, selective acid gas removal treatment systems are employed in which hydrogen sulfide and carbon dioxide are sequentially removed from the sour syngas using relatively complex configurations and low temperature as described, for example, in U.S. Pat. No. 4,430,316. While such configurations tend to expand the usefulness of the Claus process in gasification plants with low-sulfur feedstocks, various difficulties remain. Among other things, such known selective acid gas removal configurations are often capital intensive, and require relatively large quantities of energy. Moreover, such configurations typically do not allow for flexibility and can only be used for a specific and narrow range of gasifier sour syngas sulfur concentrations.

Therefore, while numerous configurations and methods for Claus plant operation with sour feed gas streams containing variable sulfur content are known in the art, all or almost all of them suffer from one or more disadvantages. Consequently, there is still a need to provide improved configurations and methods for treating feed gases with variable and/or low sulfur content.

SUMMARY OF THE INVENTION

The present invention is directed to configurations and methods of removing hydrogen sulfide from a sour feed gas stream in which the hydrogen sulfide concentration is variable and often low. In especially preferred configurations, a hydrogen sulfide enrichment stage is added to a gasification plant to boost the hydrogen sulfide concentration in an acid gas removed from gasified low-sulfur feedstocks (e.g. sour syngas) to allow Claus processing of the hydrogen sulfide, and to provide a carbon dioxide stream that is recycled to the gasifier of the gasification plant or exported for sale or sequestration. Such configurations will reduce oxygen consumption and/or reduce the support fuel requirement in low-sulfur operation mode, and can be bypassed in normal to high-sulfur operation mode.

In one aspect of the inventive subject matter, a method of treating a sour feed gas includes a step of providing a first acid gas removal unit that produces from a sour feed gas with variable hydrogen sulfide content (e.g., sour syngas, sulfur-containing refinery gas stream, or sour gas stream from a partial oxidation unit) a first acid gas comprising carbon dioxide and variable amounts of hydrogen sulfide. In another step, a second acid gas removal unit (preferably using an amine solvent that is selective for hydrogen sulfide) is provided that produces from the first acid gas a concentrated hydrogen sulfide stream and an impure carbon dioxide offgas stream, and in still another step, the hydrogen sulfide content in the sour feed gas and/or the first acid gas is determined. In a yet further step, the concentrated hydrogen sulfide stream and the first acid gas are fed to the Claus plant in a ratio that is determined by the content of the hydrogen sulfide in at least one of the sour feed gas and the first acid gas. Most preferably, the impure carbon dioxide offgas stream is fed to a Claus tail gas compressor to form a compressed carbon dioxide offgas stream, which may be recycled to the gasifier or exported for sale or sequestration.

It is generally preferred that all of the acid gas from the first acid gas removal unit be fed to the second acid gas removal unit to produce a concentrated hydrogen sulfide stream (e.g. enriched acid gas) that is fed to the Claus plant when the first acid gas stream has a hydrogen sulfide content of less than 20-25 mol %.

In another aspect of the inventive subject matter, a plant has a first acid gas removal unit that removes acid gas from a feed gas having variable hydrogen sulfide content to thereby provide a first acid gas stream that comprises carbon dioxide and variable amounts of hydrogen sulfide. A second acid gas removal unit is fluidly coupled to the first acid gas removal unit, configured to receive the first acid gas stream, and to provide a concentrated hydrogen sulfide stream and a carbon dioxide offgas stream. A Claus plant receives at least part of the concentrated hydrogen sulfide stream and the first acid gas stream, and a control unit directs the first acid gas stream and/or the concentrated hydrogen sulfide stream to the Claus plant as a function of a hydrogen sulfide concentration in the feed gas and/or the first acid gas stream.

Such plants preferably include a conduit that provides at least a portion of the carbon dioxide offgas stream to a Claus tail gas compressor to thereby form a compressed carbon dioxide offgas stream, which may be fed to the gasifier of a gasification plant, and/or which may be sequestered or further purified to form a sales gas. It is further preferred that the control unit is configured such that the concentrated hydrogen sulfide stream is fed to the Claus plant when the sour feed gas has a sulfur content of between about 0.1 wt % to about 6 wt %, and that all of the first acid gas stream is fed to the Claus plant when the feed gas has a sulfur content of above 8 wt %.

In a further aspect of the inventive subject matter, a method of modifying a gasification plant may include a step of determining that gasification of a low-sulfur feedstock will result in an acid gas stream in an acid gas removal unit of the gasification plant that is not suitable for feeding to an existing Claus plant. In another step, an acid gas enrichment unit (e.g., using an amine-solvent) is coupled to the gasification plant such that the enrichment unit produces a carbon dioxide stream and a concentrated hydrogen sulfide stream from the acid gas stream, and in yet another step, the acid gas enrichment unit is coupled to the Claus plant such that the concentrated hydrogen sulfide stream is fed to the Claus plant and such that the carbon dioxide stream is provided to a tail gas compressor.

In especially preferred methods, the low-sulfur feedstock has a sulfur content of between about 0.1 wt % and about 6 wt %, and the concentrated hydrogen sulfide stream has a hydrogen sulfide concentration of at least 20%. A bypass may be provided that is configured to allow feeding of an acid gas stream from the acid gas removal unit to the Claus plant when an alternative feedstock having a sulfur content of greater than 7% is used. Most typically, the bypass will be controlled by an automated control unit.

Various objects, features, aspects and advantages of the present invention will become more apparent from the following detailed description of preferred embodiments of the invention.

BRIEF DESCRIPTION OF THE DRAWINGS

Prior Art FIG. 1 is an exemplary schematic of a currently known plant configuration in which a gasification plant provides an acid gas that is fed to a Claus plant.

FIG. 2 is an exemplary schematic of plant configuration according to the inventive subject matter in which a gasification plant provides an acid gas to (a) an enrichment unit that provides a concentrated hydrogen sulfide stream to a Claus plant and (b) to the Claus plant, depending on the sulfur content of the sour feed gas and/or acid gas.

DETAILED DESCRIPTION

The inventors discovered that a Claus plant can be economically operated downstream of a gasification plant, even when the sulfur content of the feed stock for the gasification plant is relatively low, and/or where different feed stocks in the gasification plant will result in sour syngas with varying sulfur content.

Particularly contemplated plants include an acid gas enrichment unit and a bypass that receive, depending on the sulfur content of the raw gas, individually or together, acid gas from an upstream acid gas removal unit, wherein the acid gas removal unit removes carbon dioxide and hydrogen sulfide from (preferably cooled) sour syngas. During operation, at least a portion of the acid gas obtained from the sour syngas is fed to the acid gas enrichment unit when a low-sulfur feedstock is gasified, while all or almost all of the acid gas is routed through the bypass to the Claus plant when normal- or high-sulfur feedstock is gasified. Most preferably, the acid gas enrichment unit separates hydrogen sulfide from carbon dioxide to form a concentrated hydrogen sulfide stream that is fed to the Claus plant while the carbon dioxide from the enrichment unit is fed to a compressor (e.g., Claus plant tail gas compressor) prior to further use or disposal (e.g., recycle to the gasifier, or sequestration).

It should therefore be appreciated that using contemplated configurations and methods a Claus plant can be economically operated together with a gasification plant (or other source of acid gas) even where the sulfur content of the gasification feed stock varies substantially, and/or is relatively low. Among other advantages, contemplated plants allow a considerable reduction in oxygen consumption in the Claus plant, and further reduce or even eliminate use of syngas in the Claus plant to support proper acid gas burner/reactor temperature.

In contrast, heretofore known configurations could not be operated in an economically attractive manner where the sulfur content of the gasifier feed is relatively low, or where the sulfur content of the gasifier feed stock varied (e.g., from about 8 wt % sulfur content to about 3 wt % sulfur content). In such plants, as schematically depicted in prior art FIG. 1, the plant has a gasifier 110 that receives feed stock 112 having a sulfur content of about 0.35 wt % to about 7 wt %. High-pressure oxygen 114 is provided to the gasifier and the resultant hot sour syngas 116 (typically comprising methane, hydrogen, carbon monoxide, carbon dioxide, and sulfurous compounds (e.g., hydrogen sulfide, COS, etc.)) is fed to a cooler 120. Cooled sour syngas (e.g. sour feed gas) 126 is then fed to an acid gas removal unit 130 that produces an acid gas stream 138 (typically predominantly comprising carbon dioxide and hydrogen sulfide) and a purified syngas stream 136A. In most cases, and especially where the sulfur content in the feedstock is relatively low, a portion of the syngas 136B is used in the Claus plant as fuel to support proper acid gas burner/reactor temperature, while the acid gas is fed as stream 138 to the Claus plant 140 for recovery of elemental sulfur. Low pressure oxygen 142 is typically used to support oxidation in the Claus furnace, and tail gas 146 is preferably compressed in tail gas recycle compressor 150 to form recycle stream 156 prior to being recycled to the gasifier 110 of the gasification plant.

It should be noted that in such known configurations the gasification plant is generally limited to gasification of a feedstock with a moderate to relatively high sulfur content, as low-sulfur content feedstock will result in a low-sulfur sour syngas, which in turn will result in an acid gas that can typically not be effectively processed in a downstream Claus plant. For example, where the gasifier feedstock has a sulfur content of between about 2-6 wt %, low pressure oxygen is often needed or a significant portion of the syngas is required as support fuel, both of which have a negative impact on the overall economics. At even lower sulfur content, economical constraints become increasingly substantial and often prevent the plant from using gasifier feedstock with less than 2 wt % sulfur.

An exemplary configuration according to the inventive subject matter that avoids all or almost all of the above disadvantages is depicted in FIG. 2. Here, low-sulfur feedstock 212 (e.g., low sulfur sub-bituminous coal) is fed to the gasifier 210 together with high-pressure oxygen 214. Hot sour syngas stream 216 is then cooled in cooler 220 and the cooled sour syngas 226 is fed to the acid gas removal unit 230. Clean syngas 236 leaves the acid gas removal unit 230, which also produces acid gas stream 238.

Control unit 260 (e.g., computer controlled valve) controls the flow of the acid gas stream 238 to either the Claus plant 240 via bypass 238B, and/or the acid gas enrichment unit 270 via stream 238A. Where the control unit routes the acid gas 238 to both, the Claus plant and the acid gas enrichment unit, concentrated enriched acid gas stream 274 and bypass stream 238B may be combined to a single stream 238C prior to being fed to the Claus plant.

Most preferably, the acid gas enrichment unit 270 is configured to separate hydrogen sulfide and carbon dioxide into two separate streams. In such configurations, concentrated hydrogen sulfide stream 274 is fed to the Claus plant and typically has a hydrogen sulfide concentration of at least 10%, more typically at least 20%, and most typically at least 30-50%. It is further preferred that the carbon dioxide stream 272 from the acid gas enrichment unit is compressed using the tail gas recycle compressor 250 and then fed to the gasifier as recycle stream 256. Under most conditions, the Claus plant is supplied with low-pressure oxygen 252 to generate elemental sulfur and tail gas 246. The tail gas 246 is typically compressed and routed to the gasifier as recycle gas 256 (together with carbon dioxide 272). Alternatively, or additionally, at least part of the carbon dioxide stream 272 may also be further purified to produce a carbon dioxide sales gas, be sequestered into a formation, and/or be used for enhanced oil recovery.

Thus, it should be recognized that using contemplated configurations, feedstock with a wide range of sulfur content can be gasified in configurations that employ a Claus plant for acid gas treatment. Most advantageously, and especially where the hydrogen sulfide in the acid gas isolated from the raw gas is moderate to high, at least a portion of the acid gas stream may bypass the acid gas enrichment unit to limit the hydrogen sulfide concentration in the Claus plant feed. Above a certain sulfur concentration in the gasifier feed, the acid gas enrichment unit is completely bypassed. On the other hand, for gasifier feeds with low sulfur, only one of multiple Claus plant trains needs to be in operation with the other trains shut down and restarted when the sulfur content in the gasifier feed is increased. It should be appreciated that the configurations and methods presented herein can be implemented as retrofit to already existing plants, or can be used in a gasification plant that is built from scratch to allow for a significantly wider margin of acceptable gasification feeds. Based on preliminary calculations (data not shown), the inventors contemplate that the potential cost savings will be about 4% (as compared to a plant without the acid gas enrichment) due to the reduced oxygen usage in the Claus plant and the avoidance of the use of syngas as fuel in the Claus plant (calculated for a range of sulfur from about 0.35 wt % to 6.0 wt. % in the gasifier feed).

Therefore, contemplated methods of gas treatment especially include those in which a first acid gas removal unit is provided that produces from a feed gas with variable hydrogen sulfide content a first acid gas comprising carbon dioxide and variable amounts of hydrogen sulfide. In such methods, a second acid gas removal unit is coupled to the first unit to thereby produce from the first acid gas a concentrated hydrogen sulfide stream and a carbon dioxide offgas stream. Hydrogen sulfide content in the feed gas and/or the first acid gas is measured or otherwise determined, and the concentrated hydrogen sulfide stream and the first acid gas are then fed in a particular ratio to a Claus plant, wherein that ratio is a function of the content of the hydrogen sulfide in the feed gas and/or the first acid gas.

Consequently, in one preferred aspect of the inventive subject matter, a plant includes a first acid gas removal unit that is configured to remove acid gas from a feed gas having variable hydrogen sulfide content to thereby provide a first acid gas stream that comprises carbon dioxide and variable amounts of hydrogen sulfide. A second acid gas removal unit is fluidly coupled to the first acid gas removal unit and configured to receive the first acid gas stream, and to provide a concentrated hydrogen sulfide stream and a carbon dioxide offgas stream. Such plants will further include a Claus unit configured to receive at least part of the concentrated hydrogen sulfide stream and the first acid gas stream, wherein a control unit is configured to direct the first acid gas stream and/or the concentrated hydrogen sulfide stream to the Claus unit as a function of the hydrogen sulfide concentration in the feed gas and/or the first acid gas stream, and/or as a function of the sulfur content in the feedstock where the feed gas is from a gasification unit.

Of course, it should be recognized that contemplated configurations and methods may be implemented in form of a new plant or plant configuration, or in form of a plant upgrade. For example, where an existing plant has already a gasification facility and a Claus plant component, it should be recognized that addition of the acid gas enrichment unit can provide significant advantages. Among other things, such upgraded plants can now accept a wider range of gasification feedstock with a wider range of sulfur content (and especially with a low sulfur content) and process the acid gas in an economically advantageous manner. Thus, suitable methods of modifying a gasification plant will include a step of determining (e.g., from feedstock specification or via one or more sensors) that gasification of a low-sulfur feedstock will result in an acid gas stream in an acid gas removal unit of the gasification plant that is not economic and/or suitable for feeding to an existing Claus plant (e.g., having a sulfur concentration of less than 10%). In such methods, an acid gas enrichment unit is coupled to the gasification plant such that the enrichment unit produces a carbon dioxide stream and a concentrated hydrogen sulfide stream from the acid gas stream, and the acid gas enrichment unit is further coupled to the Claus plant such that the concentrated hydrogen sulfide stream is fed to the Claus plant and such that the carbon dioxide stream is provided to a tail gas recycle compressor.

While it is generally preferred that a coal or petroleum gasification plant is the source of the raw gas in contemplated configurations it is also contemplated that numerous other sources of raw gas also deemed suitable. Indeed, all gases that provide an acid gas fraction that is treated in a Claus unit or other sulfur removal plant are deemed suitable for use herein. For example, suitable feedstock for gasification plants include organic matter, processed or unprocessed coke, peat moss, etc. In still further contemplated aspects, numerous gases from sources other than a gasification plant are also contemplated, and exemplary sources include refinery gases, partial oxidation reaction gases, regenerator gases, flue gases, etc.

Depending on the feedstock or other source, it should be recognized that the sulfur content may vary considerably. However, a typical sulfur content of the feedstock will be between about 0.1 wt % and 20 wt % (and even higher), and in most typical uses, the sulfur content of the feedstock will be between about 0.3 wt % and 10 wt %. Thus, the raw gas stream will typically have a sulfur content of between about 0.01 wt % and 15 wt % (and in some cases even higher).

The acid gas is preferably separated from the raw syngas (or other gas source) using a conventional acid gas removal unit that may or may not have specificity towards hydrogen sulfide (relative to carbon dioxide). Thus, and among other suitable configurations, numerous solvent based acid gas removal units are deemed suitable for use in conjunction with the teachings presented herein. For example, acid gases may be removed using a physical and/or chemical solvent in a scrubber that produces a loaded solvent, which is in turn stripped, flashed, or otherwise regenerated to thereby produce the acid gas. Most typically, the acid gas will be a mixture of carbon dioxide and hydrogen sulfide, however, separate hydrogen sulfide and carbon dioxide streams are also deemed suitable herein. In further contemplated options, the acid gas my also be provided from a non-solvent separation process, and especially preferred non-solvent processes include membrane separation and adsorption. Moreover, it should be appreciated that the acid gas may further be combined with other gas streams from within the plant to form a combined acid gas stream.

The so separated acid gas will typically include carbon dioxide, hydrogen sulfide, and minor quantities (e.g., less than 5 mol %) of other impurities and inert gases. It should be appreciated that the carbon dioxide concentration in the sour syngas will depend on the gasification technology, the gasifier feedstock equilibrium water content, and feedstock ash melting properties. Therefore, and most typically, the range of carbon dioxide will be between about 4% (e.g., for dry feed gasifier, higher rank coal) to about 25% (e.g., for slurry feed gasifier, lower rank coal, sour shift). Similarly, it is expected that the hydrogen sulfide content in the so separated acid gas will typically be between 5-60%, and even higher.

With respect to the acid gas enrichment unit, it is generally preferred that the acid gas enrichment unit directly receives the acid gas from the upstream acid gas removal unit, and that the acid gas comprises hydrogen sulfide and carbon dioxide. However, additional acid gas stream may also be combined with the acid gas from the upstream unit. In further preferred aspects, the acid gas enrichment unit uses a process that separates hydrogen sulfide from carbon dioxide to thereby form a concentrated hydrogen sulfide stream and a carbon dioxide offgas stream. There are numerous such separation configurations and methods known in the art, and all of them are considered suitable for use herein. However, especially preferred configurations for the acid gas enrichment unit include amine solvent-based processes that have a relatively high specificity for hydrogen sulfide (in less preferred aspects, membrane-based and/or adsorption-based processes may also be employed).

Depending on the particular location and/or economic considerations, the enrichment absorber of the acid gas enrichment unit may be configured to produce relatively pure carbon dioxide as the overhead product that can be sold as a commodity, or sequestered or used for enhanced oil recovery after compression to suitable levels. Carbon dioxide purities of at least 70%, more typically at least 0%, and most typically at least 90% are contemplated. However, where the carbon dioxide is to be sold as a product, further purification may be implemented (e.g., using an autorefrigeration process). It should be particularly noted that the capital cost and utility requirements for the acid gas enrichment unit are relatively small. Therefore, contemplated configurations are economically very attractive and the costs can be easily offset by use of cheaper opportunity feeds and/or additional savings due to the reduced oxygen demand. Still further, it should also be appreciated that the tail gas recycle compressor can also be used for compression of the carbon dioxide from the absorber of the acid gas enrichment unit, thus avoiding the need for a new compressor. So compressed carbon dioxide is then preferably fed to the gasifier as recycle stream.

Most preferably, enrichment of the Claus feed gas is performed by treatment of the feed gas that is ordinarily provided to the Claus plant. However, in less preferred aspects, the hydrogen sulfide enrichment may also be augmented with or performed by (a) recycling of at least portion of the isolated sulfur to the Claus feed gas, and/or (b) routing a sulfur-containing process stream to the Claus plant from another plant component. Of course, it should be recognized that all known Claus processes are deemed suitable herein, including the SCOT process, the Super-SCOT process, the LS-SCOT process, the Stretford process, etc. Under most conditions, it is contemplated that the feed stream to the Claus plant will have a hydrogen sulfide concentration of at least 10%, more typically at least 15%, even more typically at least 20%, and most typically between about 20% and 50% (and even higher). Furthermore, it should be noted that the feed to the Claus plant may be a straight feed from the upstream acid gas removal unit (e.g., where high-sulfur content feedstock is gasified), or a straight feed from the acid gas enrichment unit (e.g., where low-sulfur content feedstock is gasified). However, and more typically, the feed to the Claus plant may also be a mixture of the former streams that is controlled by an operator and/or a control unit.

With respect to the control unit it is contemplated that all known control units are suitable that are configured/operable to route the acid gas stream from the upstream acid gas removal unit to at least one of the bypass circuit that provides the untreated acid gas directly to the Claus plant and the acid gas enrichment unit (most preferably in a continuously adjustable ratio). Thus, especially suitable control units include an automated system with one or more sensors that determine the hydrogen sulfide content in the raw gas and/or the acid gas coming from the upstream acid gas removal unit. Alternatively, or additionally, the control unit may also accept an operator input that specifies the sulfur content of the feedstock delivered to the gasifier. In less preferred aspects, the control system may be a relatively simple system in which an operator manually adjusts a valve or other flow control element to a predetermined flow ratio between the bypass and the acid gas enrichment unit feed.

Furthermore, it should be recognized that the flow ratio between the bypass and the acid gas enrichment unit feed may vary considerably. For example, where an operator (or other person) determines the sulfur content of a feedstock, a manual control unit may be a simple valve or switch that routes the acid gas from the acid gas removal unit to either the acid gas enrichment unit or the Claus plant. In more typical embodiments, the sulfur content may also be determined in an automated fashion (e.g., using sensors, or other data input from multiple points in the plant), which is then relayed to a computer that is programmed to determine a suitable ratio in which the acid gas is split between the acid gas enrichment unit and the Claus plant. Depending on the particular feedstock (or hydrogen sulfide concentration in the acid gas from an acid gas removal unit), the ratio may be between 100% (to Claus plant) to 0% (to enrichment unit) and 0% (to Claus plant) to 100% (to enrichment unit). For example, 80-100% of the concentrated hydrogen sulfide stream may be fed to the Claus plant when the feed gas has a sulfur content of between about 0.1 wt % to about 6 wt %, while 50-100% of the acid gas stream from the upstream acid gas removal unit may be fed to the Claus plant when the feed gas has a sulfur content of between about 8 wt % to about 20 wt %.

Thus, specific embodiments and applications of configurations and methods for Claus plant operation with variable sulfur content have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the

What is claimed is:

1. A method of treating a feed gas, comprising:
providing a first acid gas removal unit that produces from a feed gas with variable hydrogen sulfide content a first acid gas comprising carbon dioxide and variable amounts of hydrogen sulfide;
providing a second acid gas removal unit that produces from the first acid gas a concentrated hydrogen sulfide stream and a carbon dioxide offgas stream;
determining the hydrogen sulfide content in at least one of the feed gas and the first acid gas; and
feeding the concentrated hydrogen sulfide stream and the first acid gas in a ratio to a Claus plant, wherein the ratio is determined by the content of the hydrogen sulfide in at least one of the feed gas and the first acid gas.

2. The method of claim 1 further comprising a step of feeding the carbon dioxide offgas stream to a Claus tail gas recycle compressor to form a compressed carbon dioxide offgas stream.

3. The method of claim 2 further comprising a step of providing the compressed carbon dioxide offgas stream to a gasifier of a gasification plant.

4. The method of claim 1 wherein the feed gas is selected from the group consisting of a syngas, a sulfur-containing refinery gas stream, and a gas stream from a partial oxidation unit.

5. The method of claim 1 wherein the feed gas has a sulfur content of between about 0.1 wt % to about 20 wt %.

6. The method of claim 1 wherein all of the concentrated hydrogen sulfide stream is fed to the Claus plant when the feed gas has a sulfur content of between about 0.1 wt % to about 6 wt %.

7. The method of claim 1 wherein the second acid gas removal unit uses an amine solvent that is selective for hydrogen sulfide.

8. A plant comprising:
a first acid gas removal unit configured to remove acid gas from a feed gas having variable hydrogen sulfide content to thereby provide a first acid gas stream that comprises carbon dioxide and variable amounts of hydrogen sulfide;
a second acid gas removal unit fluidly coupled to the first acid gas removal unit and configured to receive the first acid gas stream and to provide a concentrated hydrogen sulfide stream and a carbon dioxide offgas stream;
a Claus plant configured to receive at least part of the concentrated hydrogen sulfide stream and the first acid gas stream; and
a control unit that is configured to direct at least one of the first acid gas stream and the concentrated hydrogen sulfide stream to the Claus plant as a function of a hydrogen sulfide concentration in at least one of the feed gas and the first acid gas stream.

9. The plant of claim 8 further comprising a conduit that provides at least part of the carbon dioxide offgas stream to a Claus tail gas recycle compressor to thereby form a compressed carbon dioxide offgas stream.

10. The plant of claim 8 wherein the Claus plant is configured such that at least part of the carbon dioxide offgas stream is fed to a gasifier.

11. The plant of claim 8 wherein the feed gas has a sulfur content of between about 0.1 wt % to about 20 wt %.

12. The plant of claim 8 wherein the control unit is configured such that the concentrated hydrogen sulfide stream is fed to the Claus plant when the feed gas has a sulfur content of between about 0.1 wt % to about 6 wt %.

13. The plant of claim 8 wherein the control unit is configured such that all of the first acid gas stream is fed to the Claus plant when the feed gas has a sulfur content of above 8 wt %.

14. The plant of claim 8 further comprising a carbon dioxide sink fluidly coupled to the plant, wherein the carbon dioxide sink is selected from the group consisting of a sequestration unit, an enhanced oil recovery unit, and a purification unit configured to produce purified carbon dioxide.

15. A method of modifying a gasification plant, comprising:
determining that gasification of a low-sulfur feedstock will result in an acid gas stream in an acid gas removal unit of the gasification plant that is not suitable for feeding to an existing Claus plant;
coupling an acid gas enrichment unit to the gasification plant such that the enrichment unit produces a carbon dioxide stream and a concentrated hydrogen sulfide stream from the acid gas stream; and
coupling the acid gas enrichment unit to the Claus plant such that the concentrated hydrogen sulfide stream is fed to the Claus plant and such that the carbon dioxide stream is provided to a tail gas recycle compressor.

16. The method of claim 15 wherein the low-sulfur feedstock has a sulfur content of between about 0.1 wt % and about 6 wt %.

17. The method of claim 15 wherein the concentrated hydrogen sulfide stream has a hydrogen sulfide concentration of at least 20%.

18. The method of claim 15 wherein the acid gas enrichment unit uses an amine-solvent.

19. The method of claim 15 further comprising a step of providing a bypass that is configured to allow feeding of an acid gas stream from the acid gas removal unit to the Claus plant when an alternative feedstock having a sulfur content of greater than 7% is used.

20. The method of claim 19 wherein the bypass is controlled by a control unit.

* * * * *